Nov. 25, 1941.  E. W. WOLF ET AL  2,264,125
LOADING AND UNLOADING APPARATUS FOR MULTIOPENING PRESSES
Filed Aug. 7, 1940   3 Sheets-Sheet 3

ELWOOD W. WOLF
ELBERT A. CORBIN JR.
INVENTORS

BY
ATTORNEY

Patented Nov. 25, 1941

2,264,125

UNITED STATES PATENT OFFICE 2,264,125

LOADING AND UNLOADING APPARATUS FOR MULTIOPENING PRESSES

Ellwood W. Wolf, Philadelphia, and Elbert A. Corbin, Jr., Lansdowne, Pa., assignors of one-third to B. C. B. Industries, a corporation of Delaware Application August 7, 1940, Serial No. 351,658

2 Claims. (Cl. 214—24)

In the glazing, water-proofing or otherwise processing of sheet material, such as coated, or laminated paper, cloth or the like, it is the practice to place the sheet material to be treated upon the working surfaces of a polishing plate, with or without other packing or cushioning materials, and then subject the same, in single or multiple units, to the required pressure and temperature in a press. One or a plurality of pieces of sheet material with their contiguous polishing plates and other accessories, which will be hereinafter described in more detail, constitute work units known in the trade as "make-readies." A press of the type referred to comprises upright standards which support an upper fixed platen or head, a lower, movable squeeze or pressure platen, a power actuated ram for forcing the lower, movable platen upwardly towards said head, and a plurality of plates movably mounted in spaced relation, said plates being preferably equipped to receive a heating or refrigerating medium. The spaces between the plates constitute work openings, into which the work units or make-readies are inserted to be subjected to the action of the press.

It has heretofore been the practice to load the make-readies into the press openings by hand and to remove the completed work in the same manner. This is very difficult, slow and hard work, due to the weight and number of the make-readies to be loaded for every cycle of the press, and the height of the press to which the operator must reach. Also manual loading and unloading is hazardous if the make-readies, which have been subjected to great heat in the press, are to be removed at once. To wait until the make-readies cool off involves prohibitive loss of time.

It is therefore the primary object of our invention to produce a substantially automatic loading and unloading apparatus for multi-opening presses of this character, whereby a plurality of make-readies are mechanically and simultaneously fed into press openings, the feeding of said make-readies into the press openings being utilized simultaneously to eject from said press the make-readies previously in the press and the processing of which has been completed.

Other features of construction and advantage will be more clearly understood from the following specification and the accompanying drawings in which:

Fig. 5 represents, on an enlarged scale, two make-readies, showing details of construction and assembly.

Figure 1:
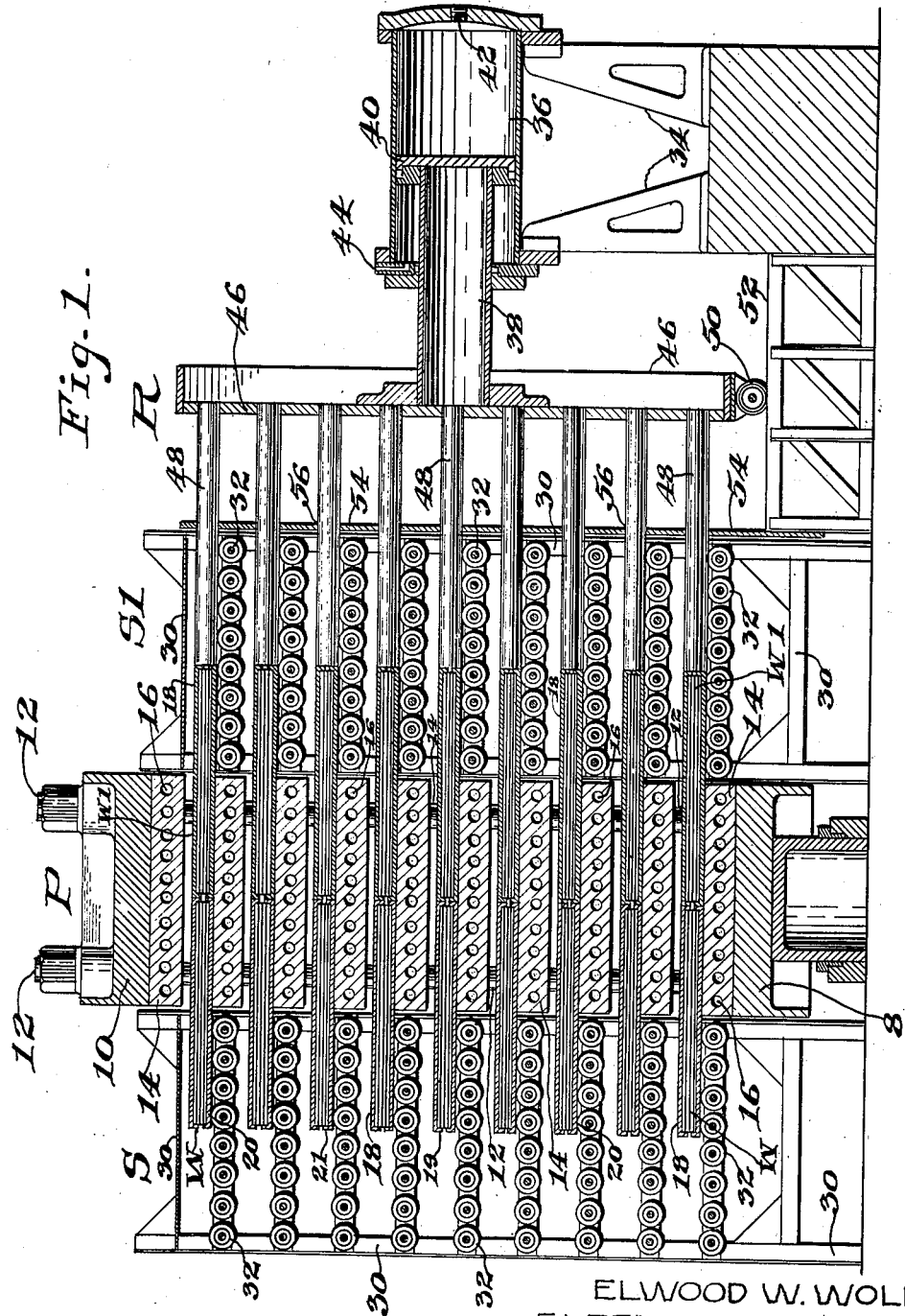
Fig. 1 represents a view in vertical section, of an apparatus embodying this invention, certain parts being omitted and the device being shown in the middle of its cycle of operation.

Referring to Fig. 1, it will be seen that our apparatus comprises, for cooperation with a multi-opening press P, a receiving or unloading rack or skid S, positioned to one side of the press, a loading rack or skid S1 positioned to the other side of the press, and a propelling or ram mechanism R for ejecting the make-readies to be treated from the loading rack S1 into the press and simultaneously ejecting from the press the make-readies which have been processed onto the receiving or unloading rack S. The press is conventional and may be of any desired power-actuated type now available on the market. The press P has the fixed head or upper platen 10, towards which is actuated by any suitable means, not shown, the lower squeeze or pressure platen 8. Between the platens 8 and 10 are suspended for limited vertical movement a plurality of spaced pressure plates 14 which may be used at room temperature, but which are provided with openings 16 to receive any desired heating or refrigerating medium. The spaces between the plates 14 constitute work openings for receiving the work units or the make-readies shown best in Fig. 5. Referring to Fig. 5, it will be seen that each make-ready or work unit comprises the covers 18 and 20 having the flanges or side walls 21 and between which are packed one or more assemblies, each comprising a filler 22, such as a blotting paper or the like, a double faced polishing plate 24, two sheets of the material to be processed 26 and 28 in contact with the opposite faces of the polishing plate 24, and another filler 22. As stated, one or a plurality of assemblies 22—28 are confined between the covers 18 and 20 and constitute a make-ready.

Figure 2:
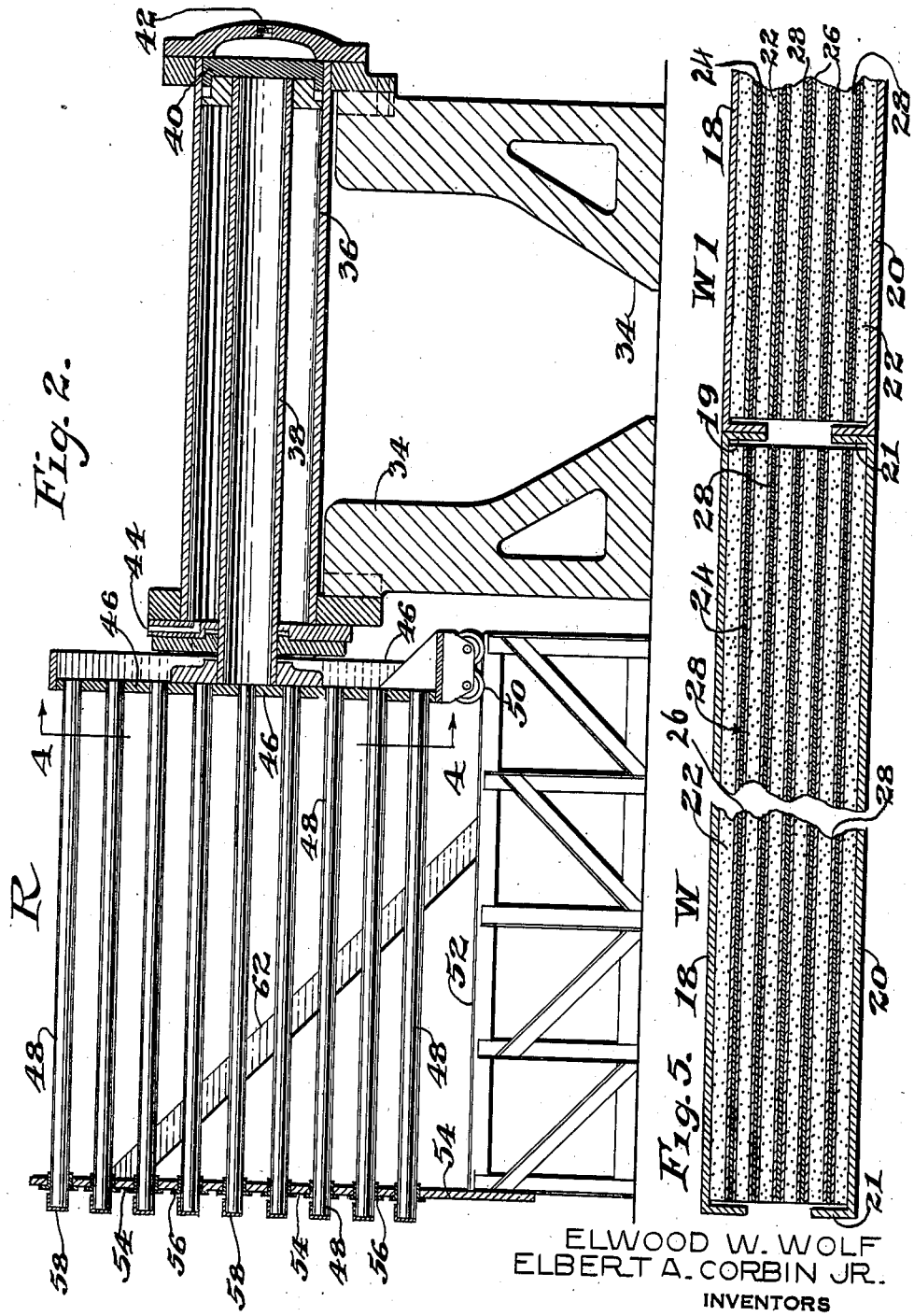
Fig. 2 represents a view, on an enlarged scale, and partly in section and partly in elevation of the apparatus, detached, and in the inoperative position.
Figure 3:
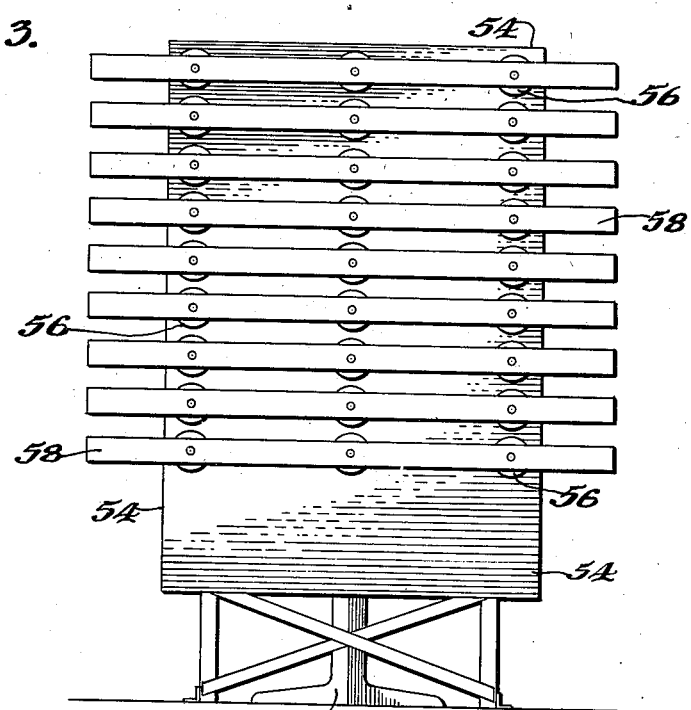
Fig. 3 represents a left hand end elevation of Fig. 2.
Figure 4:
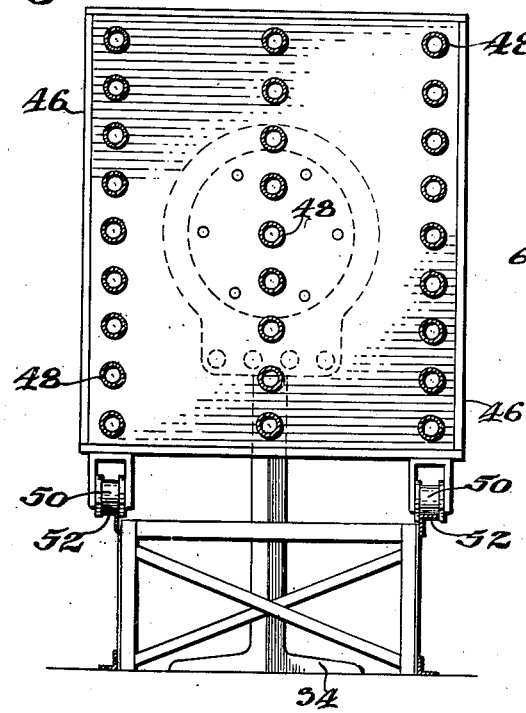
Fig. 4 represents a section on line 4—4 of Fig. 2.

In order mechanically to load into a press as many make-readies as the press has openings and simultaneously to remove from said press a corresponding number of make-readies which have already been processed, we have devised the loading and unloading racks S1 and S, which are identical in construction. Thus each of the racks S and S1 comprises a frame 30 which supports a number of roller-equipped shelves 32. The shelves 32 correspond to and register with the plates 14 of the press P when said plates are in their lower position, so that the spaces between the shelves of the racks S or S1 correspond to and register with the work openings of the press P. Assuming the press P to be filled with make-readies W, the rack S1 is filled with make-readies W1 and placed along side the machine. The empty, receiving or unloading rack S is placed along the opposite side of the machine. The ram mechanism R is placed adjacent the loading rack S1 as shown in Fig. 1. The ram mechanism comprises a pedestal 34 which supports a cylinder 36. Within the cylinder 36 is a plunger 38 having the head 40. Fluid pressure is introduced through the inlet 42 to move the plunger 38 in one direction, or through the opening 44 to retract or move the plunger 38 in the reverse direction. The plunger 38 carries the plate 46 which in turn carries the push rods 48. The plate 46 is provided with rollers 50 which ride on the tracks 52. At or near the distal end of the tracks 52 is fixedly mounted the guide plate 54 which is provided with apertures 56 through which the push rods 48 move with the movement of the plunger 38 and the supporting plate 46. It will be seen from Figs. 2, 3 and 4, that the push rods 48 are arranged in horizontal batteries (three as shown in the drawings), and that each horizontal row or battery carries a transverse pusher bar 58. In order to facilitate the removal of the assemblies 22—28 the covers 18 and 20 of the make-readies W and W1 are cut as at 60. 62 designates a reinforcing brace which was not shown in the other figures of the drawings in order to avoid confusion.

The operation is as follows:

The rack S1 is loaded at the work bench and then trundled into position alongside the press P, which has previously been charged or loaded. The empty rack S is also placed in position, all as shown in Fig. 1. Fluid pressure is then introduced through the inlet 42 to force the plunger 38 and hence the push rods 48 and the pusher bars 58 from right to left in Fig. 1. This causes the make-readies W1 on the loading rack S1 into the press openings thus displacing the make-readies W (which have been completely processed). Thus, from the press P onto the shelves of the receiving rack S the processed make-readies W are ejected from the press by the loading of the press with make-readies W1 to be processed. The fluid pressure is then vented, and the plunger 38 can be brought back or retracted to its inoperative position by introducing fluid pressure through the inlet 44. It is understood that the plunger 38 may be operated manually or by other mechanical as distinguished from fluid pressure.

Figure 6:
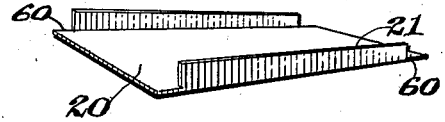
Fig. 6 represents a perspective view, on a reduced scale, of one of the covers of a work unit or make-ready.

As will be seen from Fig. 6, the flanges or side walls 21 of the covers 18 and 20 form abutments for the pressure which is exerted during the ejection of the completed make-readies W from the press P by the make-readies to be processed W1, without any damage to the delicate assemblies 22—28 one or more of which are confined between each pair of covers 18 and 20 of the respective make-readies.

Having thus described our invention, what we claim as new and desire to secure by Letters Patent is:

1. A loading and unloading apparatus for a multi-opening press having a plurality of vertically spaced and movable pressure plates, said plates occupying predetermined spaced positions when the press is opened to receive work units between said plates comprising, a receiving rack adapted to be positioned near one side of said press and having fixed spaced shelves adapted to register with said plates when said press is in the open position, a loading rack identical with said receiving rack and adapted to be positioned near the opposite side of said press, and a ram mechanism positioned on the opposite side of said loading rack and adapted to push work units from said loading rack into the openings between the plates of said press comprising, a fixed guide plate having openings therein corresponding to the openings between the shelves of said loading rack, a movable supporting plate, a plurality of pusher arms carried by said movable plate and slidable through the openings in said fixed guide plate, a plunger operatively connected to said movable plate, and means for actuating said plunger to force said pusher arms against the work units positioned in said loading rack to move said work units onto said press plates, the work units thus moved from said loading rack serving to expel work units previously carried by said press onto said receiving rack.

2. A loading and unloading apparatus for a multi-opening press having a plurality of vertically spaced and movable pressure plates, said plates occupying predetermined spaced positions when the press is opened to receive work units between said plates comprising, a receiving rack adapted to be positioned near one side of said press and having fixed spaced shelves adapted to register with said plates when said press is in the open position, a loading rack identical with said receiving rack and adapted to be positioned near the opposite side of said press and a ram mechanism positioned on the opposite side of said loading rack and adapted to push work units from said loading rack into the openings between the plates of said press comprising a fixed guide plate having openings therein corresponding to the openings between the shelves of said loading rack, a movable supporting plate a plurality of pusher arms carried by said movable plate and slidable through the openings in said fixed guide plate, a plunger operatively connected to said movable plate, means for actuating said plunger to force said pusher arms against the work units positioned in said loading rack to move said work units onto said press plates, the work units thus moved from said loading rack serving to expel work units previously carried by said press on to said receiving rack, and pusher bars carried by the free ends of said pusher arms and adapted to engage the juxtaposed edges of said work units.

ELLWOOD W. WOLF.
ELBERT A. CORBIN, Jr.